United States Patent [19]

Sakurada et al.

[11] Patent Number: 4,892,135

[45] Date of Patent: Jan. 9, 1990

[54] AIR CONDITIONER FOR AUTOMOBILES WITH HOT/REFRIGERATION COMPARTMENT FOR STORED ARTICLES

[75] Inventors: Muneo Sakurada; Isamu Kurosawa; Shinji Wakabayashi, all of Konan, Japan

[73] Assignee: Diesel Kiki Co., Ltd., Tokyo, Japan

[21] Appl. No.: 290,122

[22] Filed: Dec. 27, 1988

Related U.S. Application Data

[62] Division of Ser. No. 111,799, Oct. 22, 1987, Pat. No. 4,834,170.

[30] Foreign Application Priority Data

Nov. 21, 1986 [JP] Japan ............................. 61-179191
Mar. 12, 1987 [JP] Japan ............................. 62-36517
Mar. 23, 1987 [JP] Japan ............................. 62-68700

[51] Int. Cl.$^4$ .................. F25B 29/00; F25D 17/08
[52] U.S. Cl. ............................ 165/42; 165/43; 165/41; 62/243; 62/244; 62/186; 98/2; 98/2.06; 98/2.11
[58] Field of Search .............. 165/41, 42, 43, 76; 98/2.11, 2.06, 2; 62/244, 243, 186

[56] References Cited

U.S. PATENT DOCUMENTS 3,410,337 11/1968 Priest .................................... 165/41
3,757,851 9/1973 Marble ................................. 165/41
4,383,642 5/1983 Sumikawa et al. ................... 165/42
4,608,914 9/1986 Shimada et al. ..................... 48/2.06

FOREIGN PATENT DOCUMENTS 0011107 1/1982 Japan ........................................ 98/2
57-55211 4/1982 Japan .
57-30178 7/1982 Japan .
0138415 8/1982 Japan ................................... 62/244
0182514 11/1982 Japan ................................... 165/42
0221714 12/1983 Japan ................................... 165/43
0120513 7/1984 Japan ........................................ 98/2
0008106 1/1985 Japan ................................... 98/2.06
61-232916 10/1986 Japan .

Primary Examiner—John Ford
Attorney, Agent, or Firm—Wenderoth, Lind & Ponack

[57] ABSTRACT

An automobile air conditioner includes a duct interconnecting a blower unit and a temperature control/air distributing unit having a pair of cooling and heating heat exchangers, the duct having a cross-sectional area gradually increasing toward the temperature control-/air distributing unit. The air conditioner preferably has a hot/refrigeration compartment juxtaposed with the duct. In a preferred embodiment, the air conditioner includes a hot air control mode door for controlling a stream of hot air flowing from the heating heat exchanger toward an upper air outlet and a lower air outlet.

5 Claims, 8 Drawing Sheets

4,892,135

AIR CONDITIONER FOR AUTOMOBILES WITH HOT/REFRIGERATION COMPARTMENT FOR STORED ARTICLES

This is a division of application Ser. No. 111,799 filed Oct. 22, 1987.

BACKGROUND OF THE INVENTION

1. Field of the Invention

The present invention relates to an air conditioner for automotive vehicles.

2. Description of the Related Art

As disclosed in Japanese Patent Laid-open Publication No. 57-55211 and Japanese Utility Model Publication No. 57-30178, for example, conventional air conditioners are disposed below a part of the vehicle instrument panel extending from its central portion to the assistant driver's seat side. A blower which constitutes a part of the air conditioner is located at one end of the air conditioner adjacent to the assistant driver's seat; a heat exchanger for cooling is located in front of the assistant driver's seat; and a heat exchanger for heating an an air distributing chamber are located at the other end of the air conditioner adjacent to the central portion of the vehicle instrument panel.

The air conditioners having the foregoing construction are not satisfactory because, since the cooling heat exchanger is disposed in front of the assistant driver's seat, only a small space is available for accommodating the assistant driver's legs and hence the comfortableness of the vehicle is substantially lowered.

Another drawback associated with the conventional air conditioners is that since the blower and the cooling heat exchanger are located relatively closely to one another, an air flow passage extending between the blower and the cooling heat exchanger is necessarily flared steeply toward the cooling heat exchanger. With this arrangement, air which is driven by the blower is unlikely to be distributed evenly over the entire area of the cooling heat exchanger so that the efficiency of the heat exchange operation is reduced.

A further problem arising from the cooling heat exchanger is being located in front of the assistant driver's seat is that there is no space reserved for the installation of a hot/refrigeration compartment in such an area which would be most convenient. For accommodating the installation of the hot/refrigeration compartment, it is therefore necessary to provide an extra space within the passenger compartment, such as in a center console. Such however reduces the space available in the vehicle and the usefulness of the vehicle passenger compartment.

According to another air conditioner disclosed in Japanese Patent Laid-open Publication No. 61-232916, a cooling heat exchanger and a heating heat exchanger are disposed in an air flow duct which is subdivided into a number of duct portions corresponding to air outlets and which has air-mix doors disposed, respectively, in the duct portions to control the temperature of air blown-off from the respective air outlets.

With such a subdivided duct and the air-mix doors disposed therein, the air conditioner has a complex construction requiring an increased number of structural components.

SUMMARY OF THE INVENTION

It is therefore an object of the present invention to provide an automobile air conditioner incorporating structural features which allow a relatively large space to be maintained in the passenger compartment for receiving assistant driver's legs.

Another object of the present invention can be to provide an air conditioner for automotive vehicles which is installed without reducing the space in or usefulness of the vehicle passenger compartment.

A further object of the present invention is to provide an automobile air conditioner which has a simple construction is capable of effecting temperature control of air blown-off from each individual air outlet.

According to a first aspect of the present invention, there is provided an air conditioner for an automotive vehicle, comprising:

a temperature control/air distributing unit disposed below a central portion of an instrument panel of the vehicle and including first heat exchanger for cooling air passing therethrough, a second heat exchanger for heating air passing therethrough, and a casing in which the first and second heat exchangers are disposed, the casing having defined therein an air distributing chamber in which cold air and hot air are mixed with each other;

a blower unit including a blower and disposed below an end portion of the instrument panel located adjacent to an assistant driver's seat of the vehicle;

a duct having defined therein an air flow passage interconnecting the blower unit and the temperature control/air distributing unit, the duct being disposed below an intermediate portion of the instrument panel facing the assistant driver's seat; and the duct having a cross-sectional area that gradually increases toward the temperature control/air distributing unit.

With this construction, only the duct is provided in front of the assistant driver's seat, and hence a relatively large space is available for accommodating the legs of an assistant driver sitting in the assistant driver's seat.

According to a second aspect of the present invention, there is provided an automobile air conditioner comprising:

a temperature control/air distributing unit including a first heat exchanger for cooling air passing therethrough, a second heat exchanger for heating air passing therethrough, and a casing in which the first and second heat exchangers are disposed, the casing having defined therein an air distributing chamber in which cold air and hot air are mixed with each other;

a blower unit having a blower;

a duct having defined therein an air flow passage interconnecting the blower unit and the temperature control/air distributing unit; and a hot/refrigeration compartment juxtaposed with the duct and including a first connecting passage through which at least one of cold air passed through the first heat exchanger and hot air passed through the second heat exchanger is introduced into the hot/refrigeration compartment, and a second connecting passage interconnecting the blower unit and the hot/refrigeration compartment.

The air flow passage is free of temperature control devices and hence can be narrow to such an extent that a hot/refrigeration compartment is installed in juxtaposition with the narrow duct.

According to a third embodiment of the present invention, there is provided an automobile air conditioner comprising:

- a first heat exchanger for cooling air passing therethrough and a second heat exchanger for heating air passing therethrough, the first and second heat exchangers being disposed close to one another in a casing;
- the second heat exchanger being disposed adjacent one side of the casing;
- the casing havng a bypass passage defined by and between the other side of the casing and the second heat exchanger;
- a hot air control mode door disposed downstream of the second heat exchanger for controlling a stream of air flowing from the second heat exchanger toward an upper air outlet and a lower air outlet of the casing; and
- bypass control means disposed in the bypass passsage for regulating the amount of air flowing through the bypass passage.

With this construction, the hot air control mode door and a defrost door are positioned to conform with a selected operation mode. In particular, the mode door is positionable to control a stream of hot air flowing toward the upper air outlet and the lower air outlet. The bypass control means is operative to mix cold air with hot air flewing toward the upper air outlet, thus enabling an individual adjustment of the temperature of air to be discharged from the upper air outlet and of the temperature of air to be blown-off from the lower air outlet.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION OF THE PREFERRED EMBODIMENTS

Figure 1:
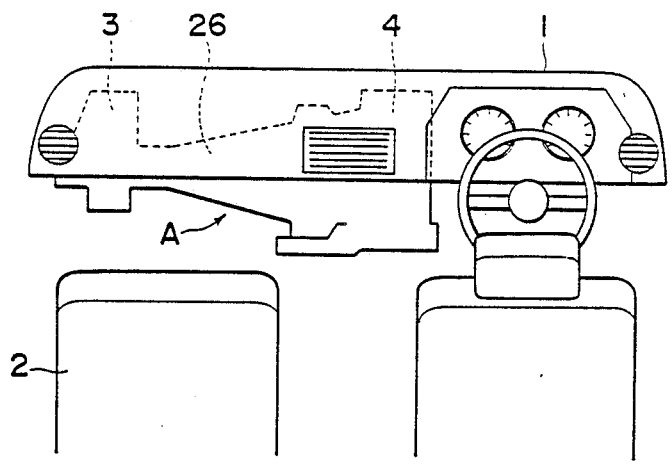
FIG. 1 is a schematic view illustrating of the manner in which an air conditioner of the present invention is mounted in an automotive vehicle.

The present invention will be described below in detail with reference to preferred embodiments taken in conjunction with the accompanying drawings. Corresponding parts are indicated by the same or corresponding reference characters throughout the drawings.

Referring now to FIG. 1, there is shown an automobile air conditioner A embodying the present invention. The air conditioner A is disposed behind an instrument panel 1 of an automotive vehicle and extends from the assistant driver's seat side to the longitudinal central axis of the vehicle. The air conditioner A comprises a blower unit 3 disposed adjacent to a side panel located near an assistant driver's seat 2, a temperature control-/air distributing unit 4 disposed substantially on the longitudinal central axis of the vehicle, and an air flow passage 5 interconnecting the blower unit 3 and the temperature control/air distributing unit 4.

Figure 2:
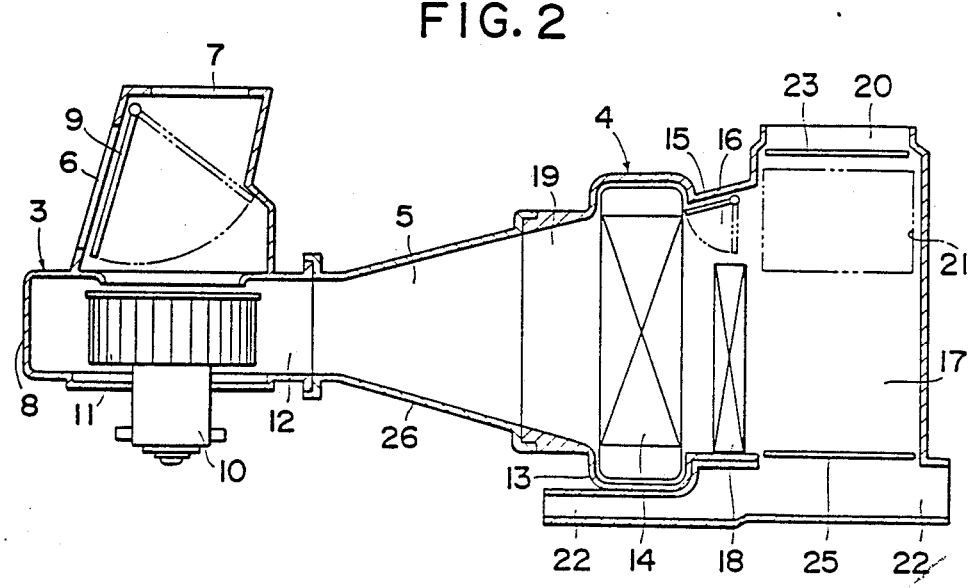
FIG. 2 is a longitudinal cross-sectional view of the air conditioner shown in FIG. 1.

As better shown in FIG. 2, the blower unit 3 of the air conditioner A includes a casing 8 having a recirculated air inlet 6 and an outside air inlet 7 provided in a branched manner, a door 9 pivotally mounted in the casing 8 adjacent to the junction between the branched inlets 6, 7 for selectively opening one of the inlets 6, 7, and a blower 11 disposed in the casing 8 and rotated by an electric motor 10. The casing 8 further includes an air outlet through which air drawn into the casing 8 is forced by the blower 11 to flow toward the downstream side of the air conditioner A.

The temperature control/air distributing unit 4 includes a casing 13, a first heat exchanger 14 disposed on an upstream end of the casing 13 for cooling air passing therethrough and a second heat exchanger 18 disposed in the casing downstream of the first heat exchanger 14 for heating air passing therethrough. The second heat exchanger 18 is disposed in a widthwise direction of the casing adjacent one side of the casing 13 so that a bypass passage 16 is defined by and between the second heat exchanger 18 and the other side of the casing 13. The bypass passage 16 is opened and closed by a bypass door 15. The casing 13 further has a distributing chamber 17 disposed downstream of the second heat exchanger 18 and the bypass passage 16, and an air inlet 19 disposed upstream from the first heat exchanger 14. The air inlet 19 has an outside diameter substantially equal to that of the first heat exchanger 14. The air distributing chamber 17 is in fluid communication with a defrost air outlet 20, an upper air outlet 21 and a lower air outlet 22. These air outlets 20–22 are opened and closed by a defrost door 23, a vent door (not shown) and a heater door 25, respectively.

The air flow passage 5 is defined in a duct 26 disposed below the instrument panel 1 and extending widthwise along a part of the instrument panel 1 facing the assistant driver's seat 2. The duct 26 is connected at one end with the air outlet 12 of the blower unit casing 8, and at the other end with the air inlet 19 of the temperature control/air distributing unit casing 13. The duct 26 is flares gradually toward the downstream side, i.e. it has a cross-sectional area gradually increasing in a direction from the blower 11 toward the first heat exchanger 14.

The duct 26 has a maximum outside diameter which is smaller than the outside diameter of the first heat exchanger 14 thereby allowing a relatively large leg space or room to be provided in front of the assistant driver's seat 2 (FIG. 1).

During operation, the electric motor 10 is energized to rotate the blower 11 whereupon the recirculated air or the outside air is drawn into the blower unit 3 through one of the air inlets 6, 7 which is selectively opened by the door 9. Then the air is driven by the blower 11 to flow successively through the first heat exchanger 14, the second heat exchanger 18 and the bypass passage 16 into the air distributing chamber 17 in which the temperature of air is regulated at a desired temperature. Then the temperature regulated air is blown-off into the vehicle passenger compartment through at least one of the air outlets 20–22 which is selected by the respective doors 23, 25.

In this instance, a stream of air, as it flows along the air flow passage 5, is gradually flared or spread and hence is distributed evenly over the entire area of the first heat exchanger 14. With this construction, the air is efficiently and uniformly cooled by the first heat exchanger 14 when the latter is operating.

Figure 3:
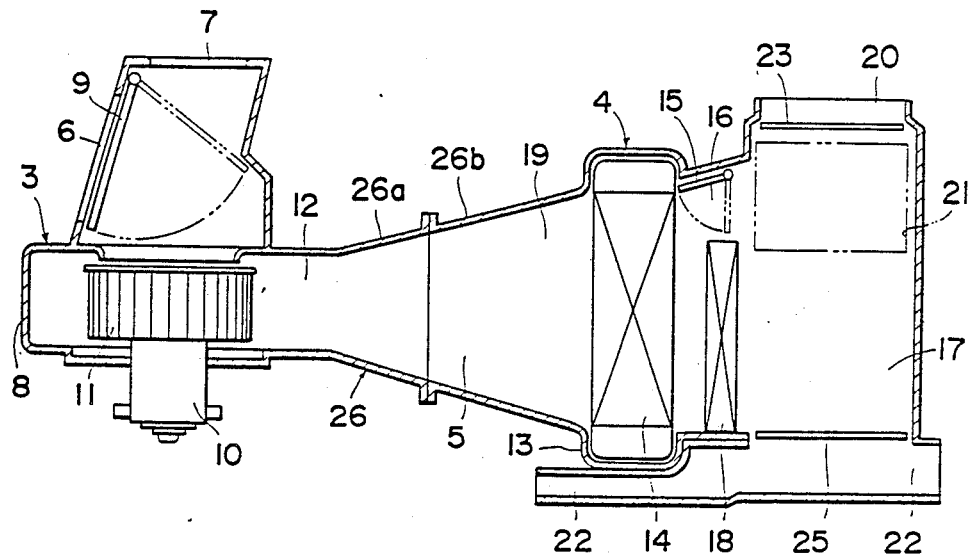
FIG. 3 is a view similar to FIG. 2, showing another embodiment of the air conditioner of the present invention.

The duct 26 in this embodiment is structurally independent from the blower unit 3 and the temperature control/air distributing unit 4. It is possible to construct the duct 26 in respective portions that are integral with the casings 8, 13, as depicted in a second embodiment shown in FIG. 3. In this embodiment, the duct 26 defining the air flow passage 5 is composed of a first duct portion 26a integral with and extending from the air outlet 12 of a blower unit casing 8 and a second duct portion 26b integral with and extending from the air outlet 19 of a temperature control/air distributing unit casing 13.

Figure 4:
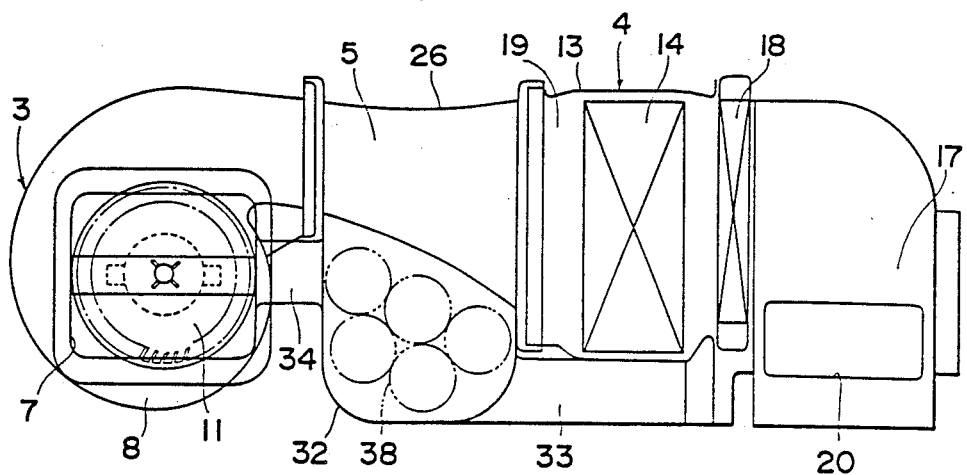
FIG. 4 is a plan view of a modified air conditioner.

A third embodiment of an air conditioner shown in FIGS. 4 and 5 will now be described. The air conditioner is structurally the same as the air conditioner A of the first embodiment except that a hot/refrigeration compartment 32 is juxtaposed with a duct 26. The compartment 32 is disposed within the maximum width of the air conditioner as shown in FIG. 4. The hot/refrigeration compartment 32 is connected with a first connecting passage 33 through which at least one of hot air and cold air is introduced into the compartment 32. It is also connected with a second connecting passage 34 through which the air is returned to the blower unit casing 8.

Figure 5:
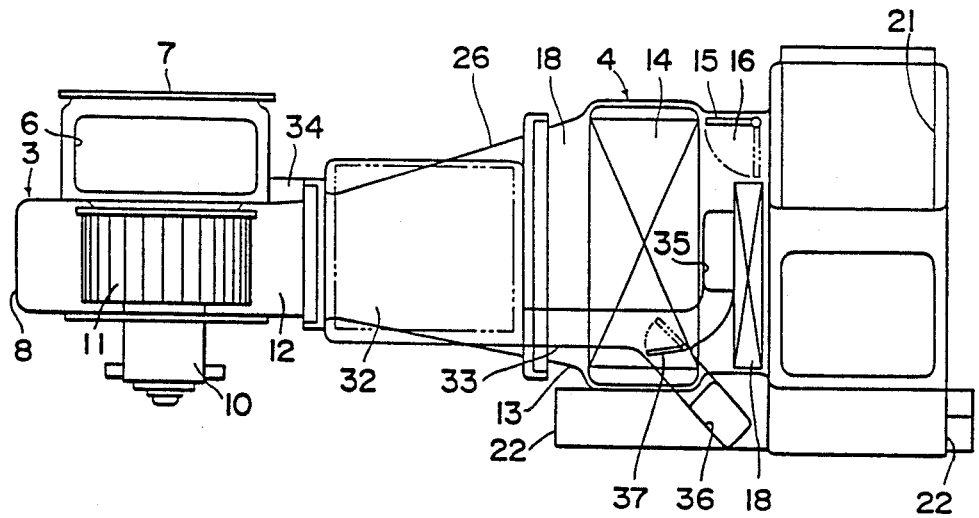
FIG. 5 is a longitudinal cross-sectional view of the air conditioner shown in FIG. 4.
Figure 6:
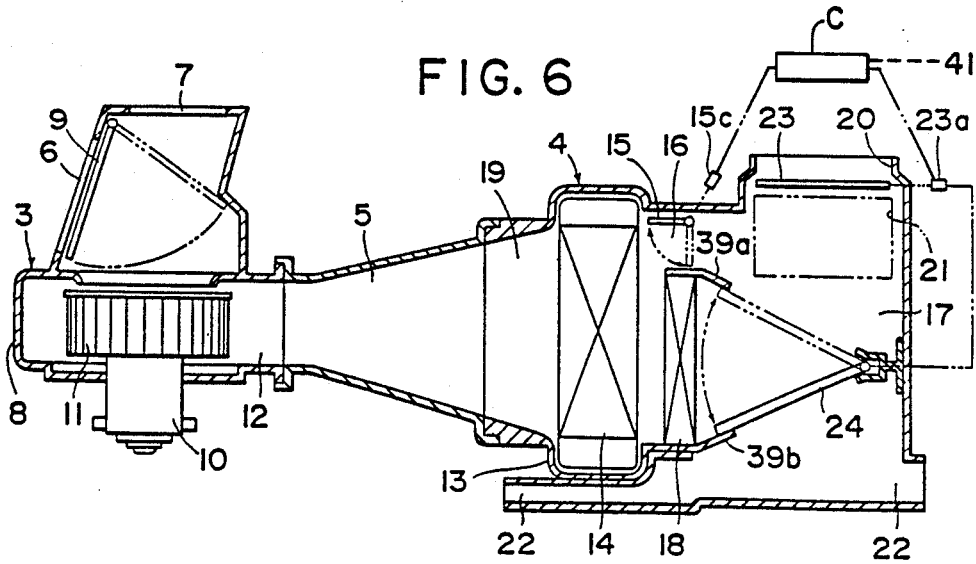
FIG. 6 is a longitudinal cross-sectional view of a further embodiment of an air conditioner according to the present invention.

As shown in FIG. 5, the first connecting passage 33 is connected at one end to the hot/refrigeration compartment 32, extends from the compartment 32 to a location at the downstream end of the temperature control/air distributing unit casing 13 and has bifurcated end portions thereat. One of the bifurcated end portions is open at a location between the first and second heat exchangers 14, 18 and hence constitutes a cold air inlet 35. The other end portion is open at a lower air outlet 22 disposed downstream of the second heat exchanger 18 and hence constitutes a hot air inlet 36. The first connecting passage 33 includes a door 37 pivotally mounted at the junction between the bifurcated end portions. The door 37 is positionally adjustable to selectively open one of the air inlets 35, 36 or regulate the ratio of the amount of hot air to cold air to be introduced into the hot/refrigeration compartment 32.

When electric motor 10 is energized to rotate blower 11, the recirculated air or the outside air is drawn into the blower unit casing 8 through a selected one of the pair of branched air inlets 6, 7. Then the air is forced to flow successively through a first heat exchanger 14, the second heat exchanger 18 and a bypass passage 16 into an air distribution chamber 17 from which the temperature controlled air is discharged into the vehicle passenger compartment through at least one of a plurality of air outlets 20–22.

During that time, in response to the position of the door 37, cold air, hot air or the mixture thereof is introduced through the first connecting passage 33 into the hot/refrigeration compartment 32 for cooling or heating articles 38 stored in the compartment 32. Access to the compartment 32 so that the articles 38 can be stored therein may be facilitated by any appropriate means (not shown) readily apparent to those of ordinary skill in the art. The air which has undergone heat exchange with the articles is then returned through the second connecting passage 34 to the blower unit casing 8.

Instead of the door 37 which is mounted at the junction between the bifurcated end portions of the first connecting passage 33, it is possible to provide a door mounted adjacent to both the cold air inlet 35 and the hot air inlet 36.

The other structural details of the embodiment are the same as those in the first embodiment and as such, require no further description.

A modified air conditioner shown in FIGS. 6 through 16 is substantially the same as the air conditioner of the first embodiment with the exception that there is provided an actuator 23a for operating a defrost door 23 disposed between a defrost air outlet 20 and an upper air outlet 21. The air conditioner further includes a hot air control mode door 24 disposed in and extending across an air distributing chamber 17 so as to divide the latter into upper and lower portions. The mode door 24 is operatively connected with the actuator 23a via a suitable linkage means such as a cam mechanism so as to move either in unison with or independently from the defrost door 23.

The hot air control mode door 24 is movable between a pair of opposite stoppers 39a, 39b joined with and projecting from upper end lower ends of the second heat exchanger 18. When the mode door 24 is brought into contact with one of the stoppers 39a, 39b, hot air is directed to one of the upper and lower air outlets 21, 22 depending on the position of the mode door 24. When the mode door 24 is set in a central position between the stoppers 39a, 39b, hot air is allowed to flow evenly toward the upper air outlet 21 and the lower air outlet 22.

Figure 7:
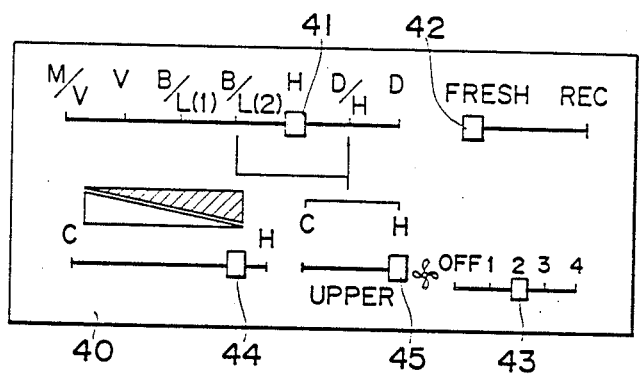
FIG. 7 is a front elevational view of a control panel used for controlling the air conditioner shown in FIG. 6.

FIG. 7 shows an example of control part of the air conditioner. The control part includes a control panel 40 on which a plurality of levers 41–45 are disposed.

The lever 41 is a mode select lever movable between a total of seven positions indicated respectively by indices "M/V", "V", "B/L(1)", "B/L(2)", "H", "D/H" and "D", for selecting one of a max-ventilation mode, a ventilation mode, a first bi-level mode, a second bi-level mode, a heat mode, a defrost-heater mode, and a defrost mode. In response to the setting of the mode select lever 41, a control circuit C of the control part sends command signals to the respective actuators 15c, 23a for moving the bypass door 15, the defrost door 23 and the hot air control mode door 24 correspondingly into respective positions to realize the thus set operation mode of the air conditioner.

The lever 42 is a select lever for shifting the door 9 from a "FRESH" position at which the outside air inlet 7 is open to a "REC" position at which the recirculated air inlet 6 is open and vice versa.

The lever 43 is a flow quantity regulating lever for regulating the amount of air to be drawn by the blower 11 into the blower unit 3. The flow quantity of air increases as the lever 43 is gradually shifted on the control panel 40.

The lever 44 is a temperature regulating lever for varying the heat capacity of the second heat exchanger 18. This lever 44 is interlocked with a hot water valve 46 to vary the degree of opening of the valve 46 between a fully closed valve position C and a fully open valve position H, thereby regulating the heat capacity of the second heat exchanger 18 and hence the amount of heat imparted to air as the latter flows through the second heat exchanger 18.

The lever 45 is an upper blown-off air temperature rgulating lever for setting the position of the bypass door 15. In response to the movement of the temperature regulating lever 45, a drive signal is delivered to the actuator 15c to move the bypass door 15 for varying the degree of opening of the bypass door 15 between a fully closed position C and a fully open position H. Such a regulating operation is effected only when the mode select lever 41 is set in the position of "B/L(2)" mode or "D/H" mode. In the other operation modes, the mode setting effected by the mode select lever 41 takes precedence over the operation of the bypass door 15.

Typical operation modes of the air conditioner will be described below with reference to FIGS. 8 through 12.

(1) Ventilation Mode

Figure 8:
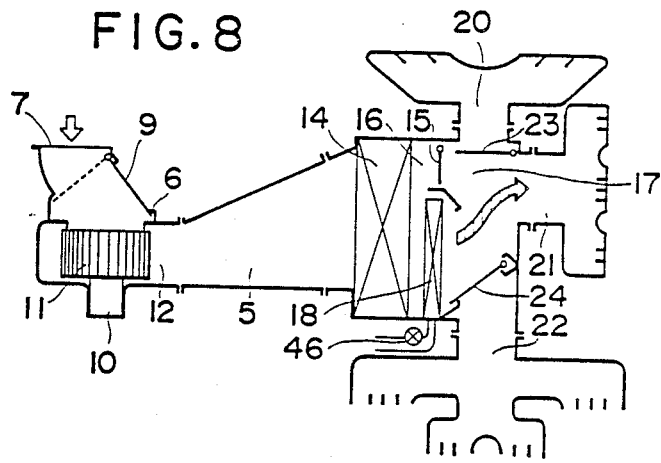
FIG. 8 is a schematic view showing the air conditioner of FIG. 6 as it is operating in a ventilation mode.

In this operation mode, the temperature controlled air is blown-off only from the upper air outlet 21. The mode select lever 41 is set in the "V" position and the select lever 42 in the "FRESH" position. With this setting, the outside air is introduced into the air conditioner as shown in FIG. 8. The bypass door 15 is set in a position at which it blocks the bypass passage 16. Likewise, the defrost door 23 and the hot air control mode door 24 are set in positions to close the defrost air outlet 20 and the lower air outlet 22, respectively. Consequently, the temperature of air to be blown-off from the upper air outlet 21 is regulated to a temperature corresponding to the set position of the temperature regulating lever 44. The temperature controlled air is then discharged into the vehicle passenger compartment in amounts corresponding to the setting of the flow quantity regulating lever 43.

(2) First Bi-level Mode

Figure 9:
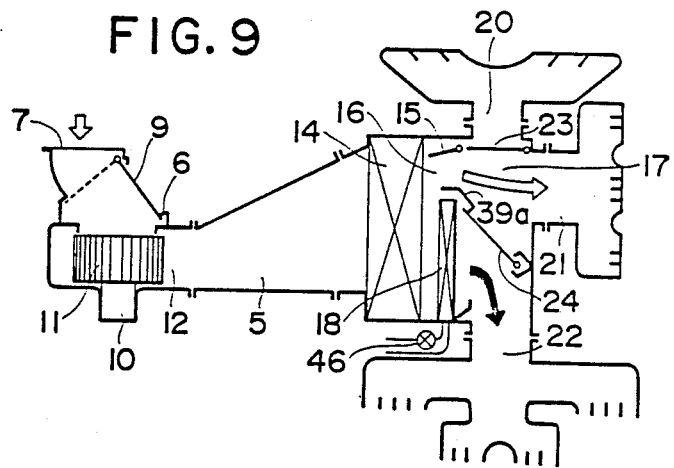
FIG. 9 is a view similar to FIG. 8, but showing the air conditioner operating in a first bi-level mode.

In this mode, the select lever 42 is set in the "FRESH" position described above (in all the following operation modes, the select lever 42 is set in the "FRESH" position), and the mode select lever 41 is set in the "B/L(1)" position. With this setting, the bypass door 15 is set in a position at which it fully closes the bypass passage 16, the defrost door 23 closes the defrost air outlet 20, and the hot air control mode door 24 engages to engage the stopper 39a to direct air from the second heat exchanger 18 to the lower air outlet 22, as shown in FIG. 9. As a result, cold air and hot air are blown-off, respectively, from the upper air outlet 21 and the lower air outlet 22, thereby keeping the head area of the passenger compartment cool and the area warm. An air conditioning mode involving such a relatively large temperature difference is thus realized as it apparent from FIG. 13 in which the correlation between the set position of the temperature regulating lever 44 and the temperature of blown-off air is shown.

(3) Second Bi-Level Mode

The mode select lever 41 is set in the "B/L(2)" position.

Figure 10:
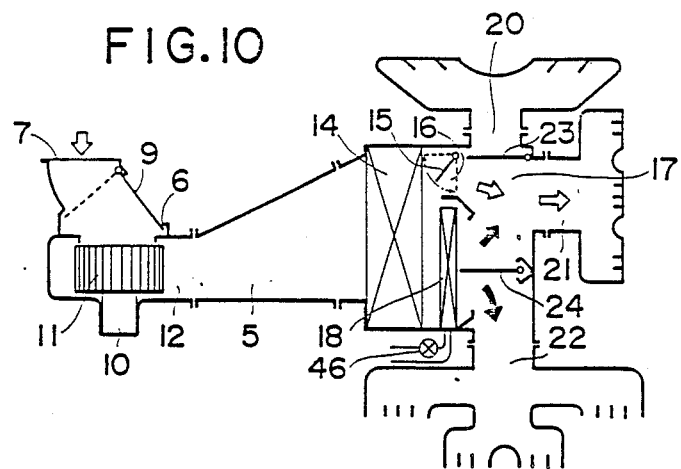
FIG. 10 is a view similar to FIG. 8, but showing the air conditioner operating in a second bi-level mode.

The hot air control mode door 24 is set in a central position and divides the second heat exchanger 8 into upper and lower portions so that two streams of hot air flow along the opposite sides of the mode door 24, both streams of hot air having the same thermal potential (FIG. 10).

The bypass door 15 is now movable, under the control of the upper blown-off air temperature regulating lever 45, to vary the degree of opening of the bypass passage 16. Depending on the set angular position of the bypass door 15, cold air flows through the bypass passage 16 into the distributing chamber 17 in which it is mixed with the hot air flowing toward the upper air outlet 21.

Figure 14:
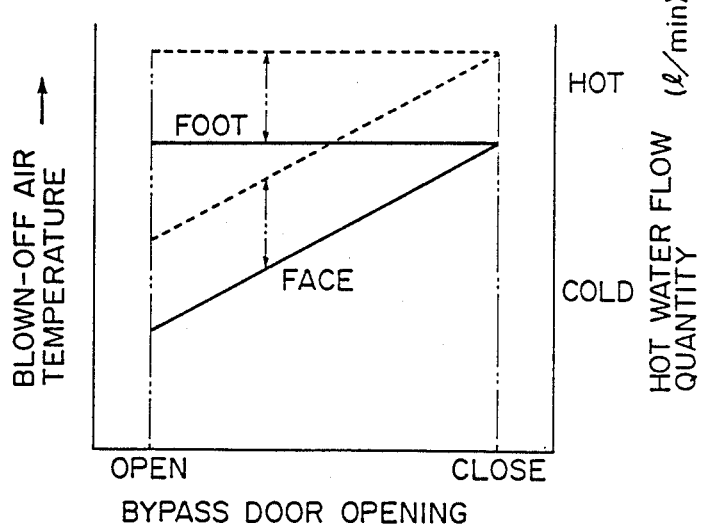
FIG. 14 is a graph illustrating the correlation between the opening of a bypass door and the temperature of blown-off air during a second bi-level mode.
Figure 15:
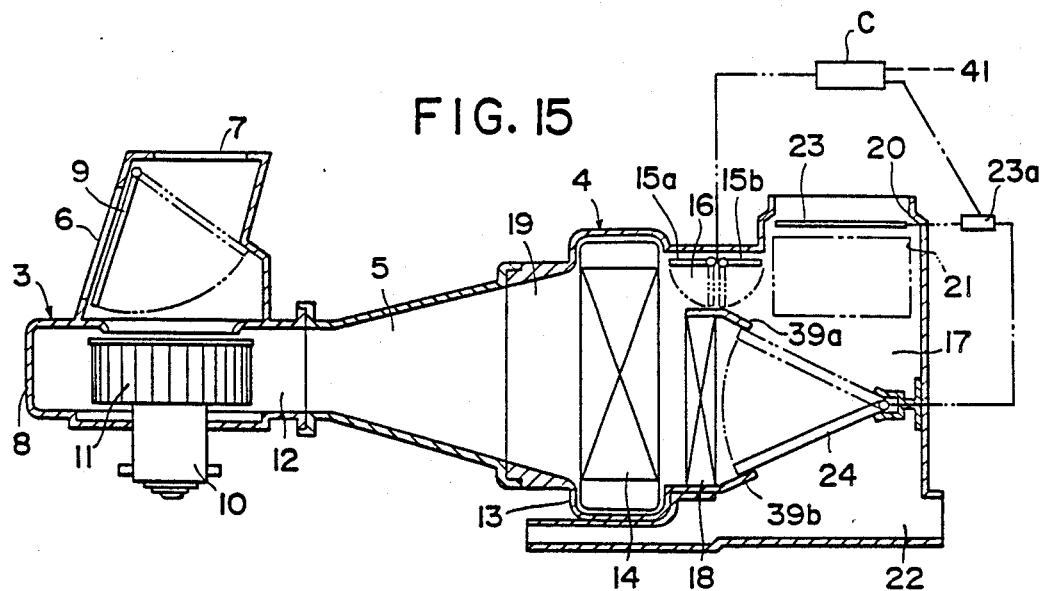
FIG. 15 is a longitudinal cross-sectonal view of an air conditioner according to another embodiment of the present invention.

In this instance, the temperature of blown-off air increases as the bypass door 15 is moved in a direction toward the closed position of the bypass passage 16, as shown in FIG. 14.

Conversely, the temperature of air discharged from the lower air outlet 22 remains constant regardless of the degree of opening of the bypass door 15. Accordingly, the temperature of air blown-off from the upper air outlet 21 can be controlled independently from the temperature of hot air discharged from the lower air outlet 22. This will ensure that the temperature difference between the air blown-off from the upper air outlet 21 and the air blown-off from the lower air outlet 22 can be controlled freely. When the temperature regulating lever 44 is operated to change the amount of hot water flowing into the second heat exchanger, the characteristic curves shown in FIG. 14 are vertically displaced between the solid-lined position and the phantom-lined position, in response to a change in the quantity of the hot water flowing.

(4) Heat Mode

The mode select lever 41 is set in the "H" position.

Figure 11:
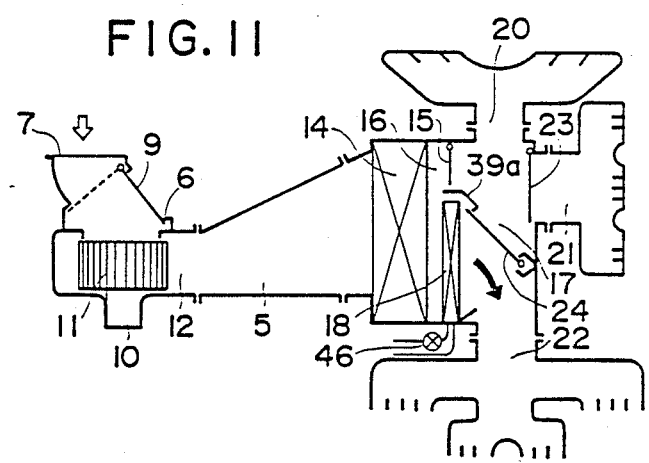
FIG. 11 is a view similar to FIG. 8, but showing a heat operation mode of the air conditioner.

As shown in FIG. 11, the hot air control mode door 24 is brought into contact with the stopper 39a so that the hot air passed through the second heat exchanger 18 is exclusively from the lower air outlet 22.

(5) Defrost Mode

Figure 12:
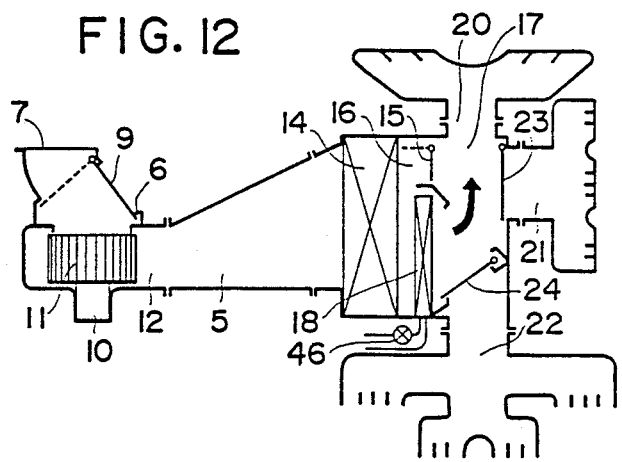
FIG. 12 is a view similar to FIG. 8, but showing a defrost mode of the air conditioner.

The mode select lever 41 is set in the "D" position and hot air is blown-off solely from the defrost air outlet 20, thereby defrosting the windshield, as shown in FIG. 12.

A full description of a fifth embodiment follows with reference to FIGS. 15 through 20. This embodiment is similar to the fourth embodiment just described above but differs therefrom in that a pair of first and second bypass doors 15a, 15b is disposed in series in the bypass passage 16. The first bypass door 15a is automatically set concurrently with the setting of the defrost door 23 and the hot air control mode door 24, depending on the set position of the mode select lever 41. The second bypass door 15b is actuatable only by the upper blown-off air temperature control lever 45 via a non-illustrated actuator or cable.

The second bypass door 15b is provided because the first bypass door is not independently controllable from the defrost door 23 and the mode door 24 because the last-mentioned three doors 15a, 23, 24 are mechanically driven by a single cam mechanism. Other structural details of this embodiment are the same as those in the fourth embodiment and as such require no further description.

Typical operation modes of the air conditioner are described below with reference to FIGS. 16 through 20 illustrating the differences between the fifth and fourth embodiments.

(1') Ventilation Mode

Figure 16:
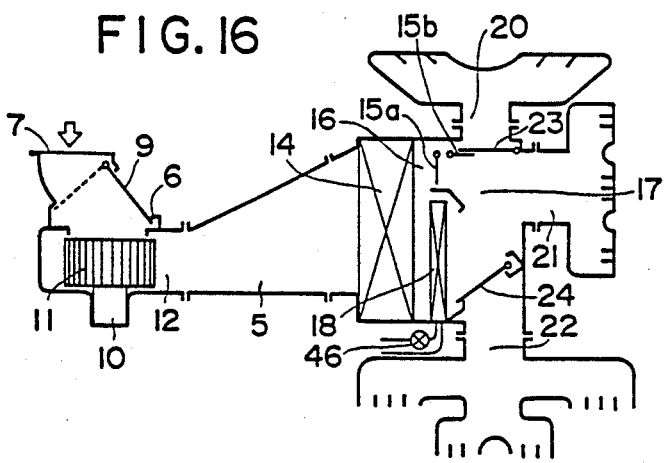
FIG. 16 is a schematic view showing a ventilation mode of the air conditioner of FIG. 15.

The defrost door 23 and the hot air control mode door 24 are disposed in the positions shown in FIG. 16. In this instance, the bypass passage 16 is blocked by the first bypass door 15a and hence the second bypass door 15b is functionally inoperative.

(2') First Bi-level Mode

Figure 13:
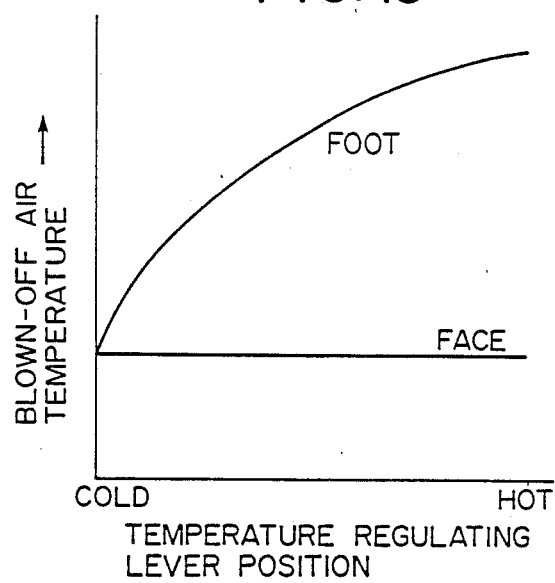
FIG. 13 is a graph illustrating the correlation between the position of a temperature regulating lever and the temperature of blown-off air during a first bi-level mode.
Figure 17:
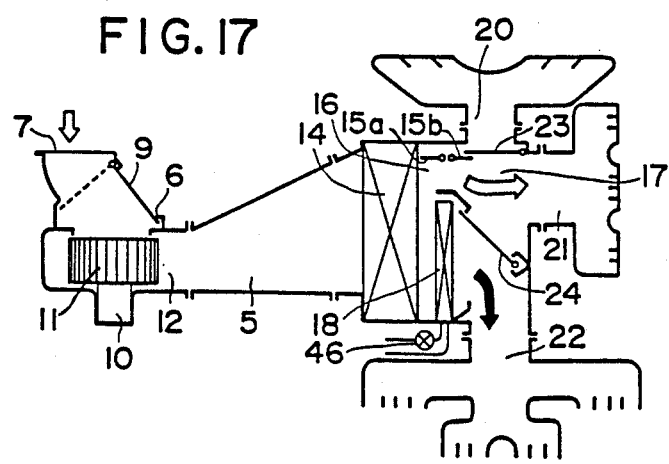
FIG. 17 is a view similar to FIG. 16, but showing a first bi-level mode of the air conditioner.

As shown in FIG. 17, the first and second bypass doors 15a, 15b are set in positions at which the bypass passage 16 is fully open. Consequently, the temperature of blown-off air is regulatable in the same manner as set forth in connection with the fourth embodiment (FIG. 13).

(3') Second Bi-level Mode

Figure 18:
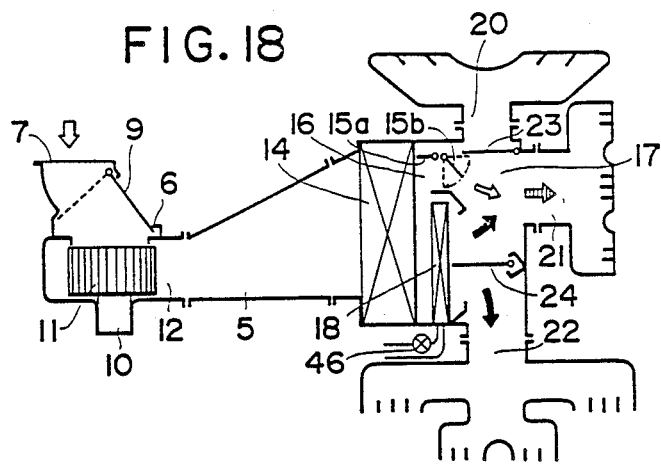
FIG. 18 is a view similar to FIG. 16, but showing a second bi-level mode of the air conditioner.

As shown in FIG. 18, the first bypass door 15a is set in its fully open position while the second bypass door 15b is positionally adjustable to regulate the temperature of air blown-off from the upper air outlet 21 in the same manner as in the fourth embodiment (FIG. 14).

(4') Heat Mode and Defrost Mode

Figure 19:
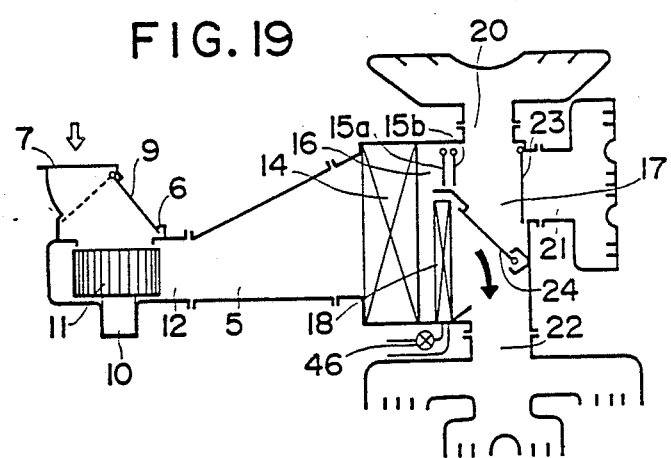
FIG. 19 is a view similar to FIG. 16, but showing a heat mode of the air conditioner.
Figure 20:
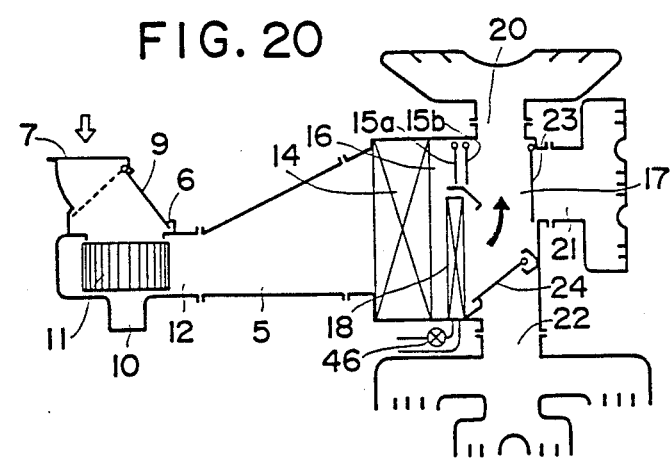
FIG. 20 is a view similar to FIG. 16, but showing a defrost mode of the air conditioner.

As is apparent from FIGS. 19 and 20, the second bypass door 15b has nothing to do with the temperature control even when the position thereof is adjusted. Consequently, the hot air is blown-off either from the lower air outlet 22 or from the defrost air outlet 20 in the same manner as in the fourth embodiment.

Obviously, many modifications and variations of the present invention are possible in light of the teachings above. It is therefore to be understood that within the scope of the appended claims, the invention may be practiced otherwise than as specifically described.

What is claimed is:

1. An automobile air conditioner comprising:
   a casing comprising sides;
   a blower unit including blower means for blowing air through the air conditioner in a flow direction, and a duct connected between said blower unit and said casing and in which an air flow passage is defined through which air blown by said blower means flows in said flow direction into said casing;
   a first heat exchanger means disposed in said casing for cooling air passing therethrough;
   a second heat exchanger means disposed in said casing downstream from with respect to said flow direction and adjacent to said first heat exchanger means for heating air passing therethrough,
   said second heat exchanger means extending from one of said sides of said casing in a direction generally perpendicular to said flow direction to a location spaced from the other of said sides of said casing, a bypass passage defined between said second heat exchanger means and said other side of said casing;
   an air distribution chamber defined in said casing open to said second heat exchanger means and disposed immediately downstream thereof with respect to said flow direction,
   said air distribution chamber having an upper portion in which a defrost air outlet and an upper air outlet are defined, and a lower portion in which a lower air outlet is defined;
   bypass control means disposed in said bypass passage for regulating the amount of air flowing through said bypass passage; and
   a hot/refrigeration compartment means juxtaposed with said duct for heating or cooling articles stored therein,
   said hot/refrigeration compartment means including a first connecting passage in communication with said casing in a manner in which at least one of air having passed through said first heat exchanger means and air having passed through said second heat exchanger means is able to pass through said first connecting passage to said hot/refrigeration compartment means, and a second connecting passage in communication with said blower unit in a manner in which air within said hot/refrigeration compartment means is able to pass through said second connecting passage to said blower unit.

2. An automobile air conditioner as claimed in claim 1, wherein said bypass control means comprises a bypass door movable between a first position at which said bypass door extends from said other side of said casing to said second heat exchanger and parallel thereto thereby blocking said bypass passage and a second position at which said bypass door is disposed out of said bypass passage.

3. An automobile air conditioner as claimed in claim 1, wherein said duct has a cross-sectional area that increases in a direction taken from said blower unit toward said casing.

4. An automobile air conditioner as claimed in claim 3, wherein said duct is structurally independent from said blower unit and said casing.

5. An automobile air conditioner as claimed in claim 1, wherein said first connecting passage is bifurcated at an end thereof, one branch of said bifurcated end being open to said casing between said first and said second heat exchanger means and the other branch of said bifurcated end open to said lower air outlet, and further comprising a mode door disposed in said first connecting passage for selectively opening said hot/refrigeration compartment means to the branches of said bifurcated end.

* * * * *